United States Patent [19]

Terry et al.

[11] Patent Number: 5,499,047
[45] Date of Patent: Mar. 12, 1996

[54] DISTRIBUTION NETWORK COMPRISING COAX AND OPTICAL FIBER PATHS FOR TRANSMISSION OF TELEVISION AND ADDITIONAL SIGNALS

[75] Inventors: John B. Terry, Carp; Alastair A. Warwick, Ottawa; Carl W. C. Anderson, Kanata, all of Canada

[73] Assignee: Northern Telecom Limited, Montreal, Canada

[21] Appl. No.: 348,850

[22] Filed: Nov. 28, 1994

Related U.S. Application Data

[63] Continuation-in-part of Ser. No. 175,455, Dec. 30, 1993, Pat. No. 5,408,259.

[51] Int. Cl.[6] .................................................. H04N 7/173
[52] U.S. Cl. .................... 348/6; 348/12; 455/3.1
[58] Field of Search ........................ 348/6, 12, 8, 13; 455/3.1, 5.1, 4.2; 359/125; 358/86; H04N 7/173, 7/16, 7/10

[56] References Cited

U.S. PATENT DOCUMENTS

| | | | |
|---|---|---|---|
| 3,581,209 | 5/1971 | Zimmerman et al. | 325/308 |
| 3,987,398 | 10/1976 | Fung | 325/309 |
| 4,268,859 | 5/1981 | Ost | 358/114 |
| 4,367,557 | 1/1983 | Stern et al. | 455/4 |
| 5,126,840 | 6/1992 | Dufresne et al. | 348/6 |
| 5,408,260 | 4/1995 | Arnon | 348/6 |
| 5,421,030 | 5/1995 | Baran | 348/12 |

OTHER PUBLICATIONS

J. Terry, "Future Directions—Broadband ISDN Access—Alternative Technologies and Delivery Systems", IEEE ISDN '91, Tucson, Arizona; published IEEE Communications Magazine, Aug. 1992.

Primary Examiner—James J. Groody
Assistant Examiner—Chris Grant
Attorney, Agent, or Firm—R. John Haley

[57] ABSTRACT

A cable television network is supplemented with optical fibers and fiber termination units to communicate additional downstream digital signals and upstream signals. A drop unit for each customer premises is provided in the drop cable. The drop unit demodulates downstream signals and selects for delivery to the customer premises only those downstream signals addressed to the customer premises, modulating the selected signals using binary phase shift keying (BPSK) which provides relative immunity to noise for forwarding the signals to the customer premises. Upstream BPSK signals from the customer premises are demodulated and remodulated in the drop unit to isolate the customer premises wiring from the rest of the network.

17 Claims, 2 Drawing Sheets

DISTRIBUTION NETWORK COMPRISING COAX AND OPTICAL FIBER PATHS FOR TRANSMISSION OF TELEVISION AND ADDITIONAL SIGNALS

This is a continuation-in-part of U.S. patent application Ser. No. 08/175,455, now U.S. Pat. No. 5,408,259, filed Dec. 30, 1993 by Alastair A. Warwick and entitled "Data Modulation Arrangement For Selectively Distributing Data", the entire disclosure of which is hereby incorporated herein by reference.

RELATED APPLICATION

Reference is also directed to U.S. patent application Ser. No. 08/338,850 filed Nov. 14, 1994 by Michael Takefman and entitled "Communications In A Distribution Network", the entire disclosure of which is also hereby incorporated herein by reference.

BACKGROUND OF THE INVENTION

This invention relates to a cable television signal distribution network, and is particularly concerned with what is termed a "hybrid fiber coax network", in which a conventional coaxial cable network for distribution of television signals is supplemented by optical fiber transmission paths and other equipment for communications of additional television and/or other signals, which may include bidirectional signals in digital form.

Cable television distribution networks are well known. In such networks, analog television signals are carried to customers via a branched coaxial distribution cable which includes bridger amplifiers, line extenders, and customer taps. Each television signal occupies a 6 MHz channel at a frequency from about 50 MHz to about 450 MHz or more. The upper frequency is limited by the bandwidth of the bridger amplifiers and line extenders and the attenuation of the coaxial cable, which as is well known increases with increasing frequency and cable distance.

There is an increasing desire for additional capacity in cable television distribution networks. This includes a desire for additional broadcast television signals especially in compressed digital form, additional facilities including for example video-on-demand (VOD) and near-VOD services (e.g. movies broadcast with stepped starting times), and a desire for transmission of control information in the opposite, upstream, direction via the network. There is also a desire to provide bidirectional transmission capabilities for transmission of arbitrary types of signals at various bit rates, for example for computer communications and for voice or telephone communications.

In addition, it is desired for security and commercial reasons to be able to deliver to each customer premises only those signals which are intended for that customer premises. For example, downstream signals may include confidential (e.g. banking) information which is to be delivered to a particular customer and not to other customers, and broadcast information (e.g. paid-for television programs) which is to be delivered only to specific customer premises authorized to receive such information.

Furthermore, it is important to ensure that, in the event of a fault in or tampering with equipment in the customer premises, upstream transmission from other customer premises is not disrupted. It is also necessary to ensure that noise or interference arising in the wiring at a customer premises is not communicated upstream where it could detract from communications on the cable network, and does not detract from or interfere with the downstream digital signals and television signals, this being particularly significant for the distribution of the various signals using existing customer premises wiring.

Various prior television signal distribution arrangements have been provided or proposed to meet some of these needs. Generally, such proposals do not sufficiently address the demand for upstream bandwidth especially for bidirectional transmission capabilities, and do not address the problems of upstream noise or interference originating from the many customer premises which may be connected in such arrangements.

For example, Zimmerman et al. U.S. Pat. No. 3,581,209 issued May 25, 1971 and entitled "Cable Television Program Capacity Enhancement" discloses a network having taps for individual or groups of customers in which channels for delivery to a customer are selected from a larger number of distributed channels. The arrangement uses bandpass filters and mixers for frequency changing. The taps are not addressable.

Fung U.S. Pat. No. 3,987,398 issued Oct. 19, 1976 and entitled "Remote Disconnect-Reconnect Tap For Cable Television Systems" discloses an arrangement in which taps are addressed using DTMF signals for remotely switching on and off cable service to customers, and also discloses an upstream feedback channel.

Ost U.S. Pat. No. 4,268,859 issued May 19, 1981 and entitled "High Security Cable Television Access System" discloses a cable television arrangement in which taps are switched on and off remotely by pulse sequences for selectively controlling delivery of paid-for programs.

Stern et al. U.S. Pat. No. 4,367,557 issued Jan. 4, 1983 and entitled "Wired Broadcasting Systems" discloses an arrangement in which addressable taps are controlled remotely by RF signals and power supply signals to control switches for each customer for selectively jamming broadcast channels.

A presentation by Jack Terry entitled "Future Directions—Broadband ISDN Access—Alternative Technologies and Delivery Systems" in December 1991 at IEEE ISDN '91, Tucson, Ariz. and published in IEEE Communications Magazine, August 1992 discusses various ways in which cable television networks may evolve using digital transmission with QAM (quadrature amplitude modulation) and optical fiber transmission.

None of these prior arrangements or proposals is sufficient to meet all of the needs described above.

Accordingly, an object of this invention is to provide an improved cable television signal distribution network.

SUMMARY OF THE INVENTION

According to one aspect of this invention there is provided a cable television signal distribution network in which television signals on a distribution cable are supplied to customer premises via respective customer taps and drop cables, comprising: an optical fiber path and a fiber termination unit for supplying digital signals to the distribution cable modulated at higher frequencies than the television signals, the digital signals including signals addressed to particular customer premises; and a drop unit coupled in the drop cable of a particular customer premises, the drop unit comprising: a receiver for receiving and demodulating the digital signals; a control unit responsive to the addressed signals for identifying digital signals addressed to the particular customer premises; and a transmitter for modulating the identified digital signals addressed to the particular customer premises and for forwarding the modulated signals to the customer premises with the television signals.

Thus in a network in accordance with the invention, digital signals can be addressed for particular customer premises, and the control unit of each drop unit only permits identified signals addressed to the particular customer premises to be forwarded to the customer premises, along with the conventional television signals. This meets the desire for security and privacy of signals supplied downstream for the customer premises.

Preferably the digital signals on the distribution cable are modulated in accordance with a first form of modulation and the digital signals forwarded to the customer premises are modulated in accordance with a second form of modulation, the second form of modulation having a greater bandwidth and noise immunity than the first form of modulation. Advantageously the second form of modulation comprises binary phase shift keying. This provides a particularly robust way of communicating signals to and within the customer premises using existing wiring, while permitting greater capacity for digital signals where it is needed, on the distribution cable.

For accommodating upstream transmission as is necessary for upstream control information and bidirectional signals, preferably the drop unit further comprises an upstream signal receiver for receiving and demodulating upstream digital signals from the respective customer premises, and an upstream signal transmitter controlled by the control unit for modulating the demodulated upstream digital signals and for forwarding the modulated upstream digital signals to the fiber termination unit. The upstream signal receiver can conveniently comprise a binary phase shift keying demodulator, and the upstream signal transmitter can conveniently comprise a phase shift keying modulator, for example for binary or quadrature phase shift keyed modulation.

The provision of a demodulator and a modulator for the upstream signals, even where these both operate in accordance with the same modulation scheme such as binary phase shift keying, and control of the modulator by the control unit, provides a separation between the customer premises wiring and the distribution cable, so that noise and interference due to the customer premises wiring, or a fault or tampering in the customer premises, can only affect the communications at limited times when the particular drop unit is authorized to transmit signals upstream, in accordance with a TDMA (time division multiple access) scheme for the upstream transmission of signals. This meets the need discussed above to prevent faults, tampering, and noise at one customer premises interfering with the communications of other customer premises.

The drop unit can be positioned at any desired point along the length of the drop cable. In particular, it can be coupled directly to the customer tap and via the drop cable to the customer premises, in which case it is convenient to derive power for the drop unit from the distribution cable, or it can be coupled directly to the customer premises and via the drop cable to the customer tap, in which case it is convenient to derive power for the drop unit from the customer premises.

Another aspect of this invention provides a drop unit for connection via a drop cable between a customer tap and a customer premises in a cable television signal distribution network in which television signals and higher frequency modulated digital signals are supplied to the customer tap via a distribution cable, the digital signals including signals addressed for a particular customer premises, the drop unit comprising: a downstream signal receiver for receiving and demodulating the digital signals; a control unit for identifying particular addressed digital signals; a downstream signal transmitter for modulating the identified particular addressed digital signals and for forwarding the modulated signals to the customer premises with the television signals; an upstream signal receiver for receiving and demodulating upstream digital signals from the respective customer premises; and an upstream signal transmitter controlled by the control unit for modulating the demodulated upstream digital-signals and for forwarding the modulated upstream digital signals to the distribution cable via the customer tap.

BRIEF DESCRIPTION OF THE DRAWINGS

The invention will be further understood from the following description with reference to the accompanying drawings, in which.

DETAILED DESCRIPTION

Figure 1:
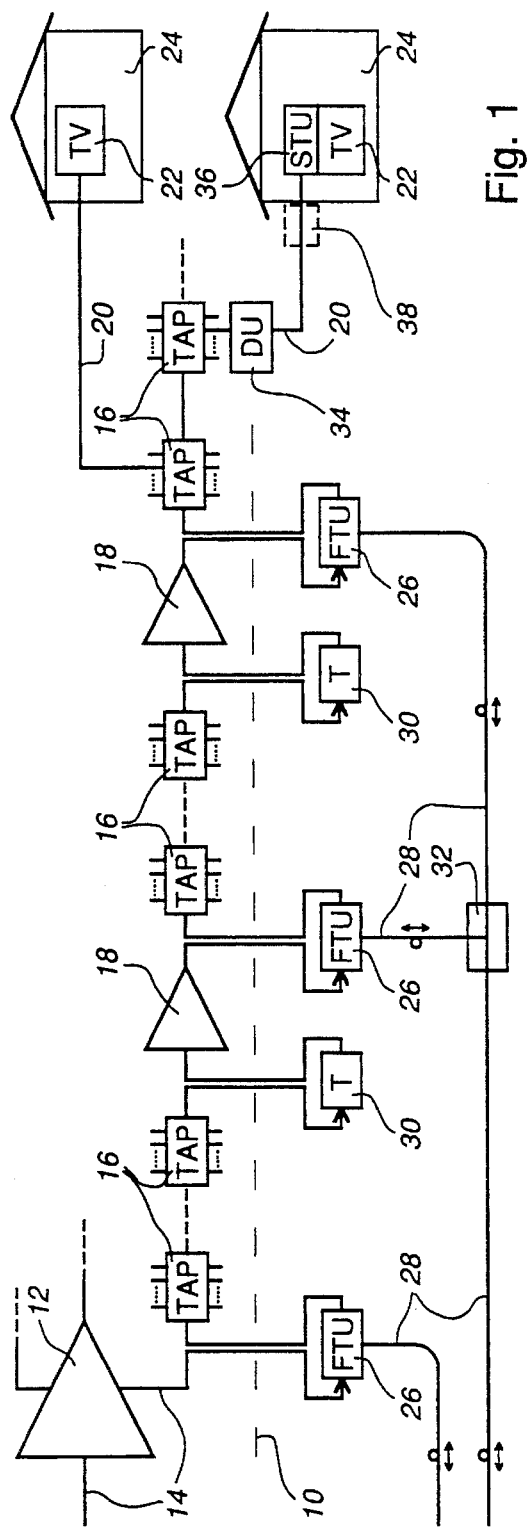
FIG. 1 schematically illustrates a network comprising a cable television distribution network with an additional bidirectional transmission capability and a drop unit in accordance with an embodiment of the invention.

FIG. 1 illustrates parts of a conventional cable television distribution network, shown above a broken line 10, which is supplemented with an additional bidirectional transmission capability, shown below the broken line 10. As is well known, the conventional cable television distribution network comprises a bridger amplifier 12, coaxial cables 14, passive customer taps (TAP) 16, line extenders 18, and a coaxial drop cable 20 to terminals, for example a television receiver (TV) 22, in customer premises 24.

The additional bidirectional transmission capability comprises optical fiber termination units (FTUs) 26 and optical fibers 28 connected thereto. Each FTU 26 is inserted into the path of a coaxial cable 14 following a bridger amplifier 12 or line extender 18, and serves to supply to the coaxial cable 14 in the downstream direction (from the so-called head end, not shown, to the customer premises) digital signals at frequencies above those of the analog television signals already carried by the cable 14, as further described below. The network generally also includes termination units (T) 30 which are inserted into the coaxial cable 14 preceding the line extenders 18 and serve substantially to eliminate the high frequency digital signals from being supplied downstream to the line extenders and from being reflected back upstream to the taps 16. However, if the coaxial cable 14 is sufficiently long, so that the high frequency digital signals are sufficiently attenuated, and the bandwidth of the line extenders 18 is sufficiently restricted (for example to 550 MHz), then the termination units 30 can be omitted.

The high frequency digital signals are carried from the head end via the optical fibers 28 to each FTU 26. As illustrated in FIG. 1, different FTUs can be coupled individually to a respective fiber 28, or a plurality of FTUs 26 can be coupled via an optical splitter 32 to a common fiber 28 extending from the head end. In either case, the FTU 26 inserts the high frequency digital signals onto the coaxial cable 14 so that these are carried with the analog television signals as far as the next termination unit 30 or line extender 18. The analog and digital signals are then available to the customer premises 24 via the customer taps 16, each of which is supplemented with a drop unit (DU) 34 as described further below for supplying signals to terminals, for example television set-top units (STU) 36, within the customer premises 24, via the existing cable drops 20. As this invention is not directly concerned with the FTUs 26 and the set-top units 36, these are not further described here.

Although as indicated above and as described in detail below, each drop unit 34 is provided at a respective customer tap 16 and is supplied with power derived from the coaxial cable 14, as shown in FIG. 1 by a broken-line box 38 each drop unit could alternatively be provided at the customer premises end of the drop cables 20 and be supplied with power from the customer premises 24. For example a drop unit could be provided as a wall unit on the outside of a customer premises 24, and/or a drop unit could be provided at an intermediate point along the length of a drop cable 20.

In the opposite, upstream, direction of transmission, a unit 36 can send control signals (for example, television program requests) and optionally other information to the head end via the coaxial cable drop 20, drop unit 34, customer tap 16, coaxial cable 14, FTU 26, and optical fibers 28. Different wavelengths or other forms of multiplexing can conveniently be used for the different directions of transmission on the optical fibers 28.

Figure 2:
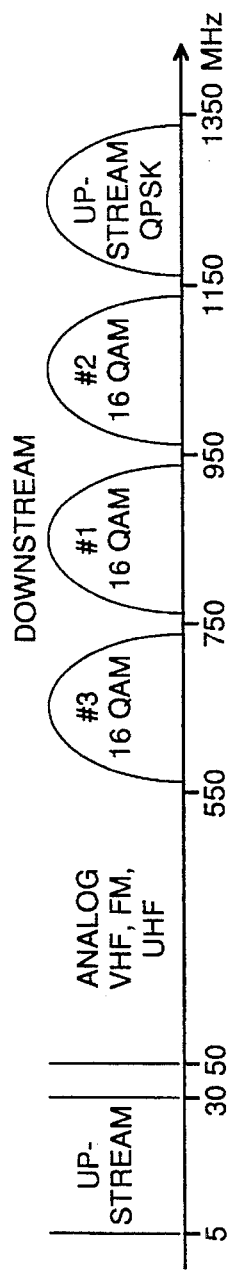
FIGS. 2 and 3 illustrate radio frequency spectra at different points in the network of FIG. 1.

Referring to FIG. 2, conventional analog VHF and UHF television signals and FM radio signals are carried by the coaxial cables 14 at frequencies from 50 to 550 MHz. Additional UHF television signals may possibly be present at higher frequencies, for example about 33 additional signals at frequencies from 550 MHz up to about 750 MHz, depending upon the bandwidth of the bridger amplifiers 12 and line extenders 16 and the attenuation of the coaxial cables 14.

At higher frequencies, in a frequency range from 750 to 950 MHz, a first 16 QAM (quadrature amplitude modulated) digital signal channel is supplied from the FTUs 26 to the coaxial cable 14. This can provide a data rate of 600 Mb/s, and thus can accommodate 200 compressed digital video signals each with a bit rate of 3 Mb/s. A second similar channel is provided in a frequency range from 950 to 1150 MHz, accommodating another 200 digital video signals, and a third similar channel can be provided in the frequency range form 550 to 750 MHz to accommodate a further 200 digital video signals, replacing a smaller number of possible analog television signals in this frequency range.

For the upstream direction of transmission, control signals can be carried in the relatively low frequency range from 5 to 30 MHz, but preferably control signals and possibly other data are carried in a QPSK (quadrature phase shift keyed) channel providing an upstream bit rate of 300 Mb/s in a frequency range from 1150 to 1350 MHz, as shown in FIG. 2.

Figure 3:
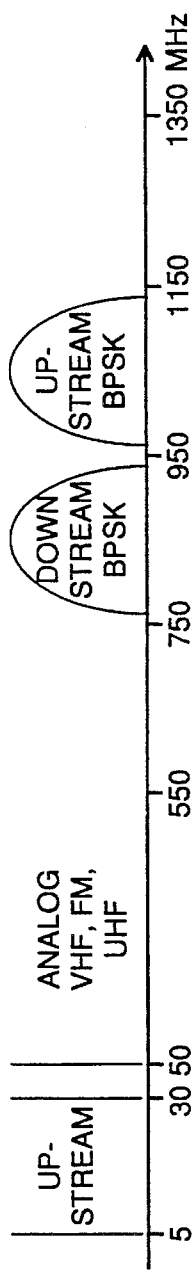

On the coaxial cable drops 20 (i.e. downstream from the drop units), the radio frequency spectrum is as shown in FIG. 3. Up to 750 MHz, the spectrum is the conventional analog signal spectrum in the frequency range from 50 to 750 MHz, with the option of low frequency upstream control signals in the frequency range from 5 to 30 MHz as described above. The digital video signals are carded downstream on the cable drops 20 to the customer premises in the form of a BPSK (binary phase shift keyed) signal providing a bit rate of 150 Mb/s in a frequency range from 750 to 950 MHz. This bit rate can accommodate 50 compressed digital video signals each with a bit rate of 3 Mb/s. Control signals and other data are preferably carried upstream via the cable drops 20 by a multiple access BPSK signal providing the same bit rate of 150 Mb/s in a frequency range from 950 to 1150 MHz.

It should be appreciated that the high frequency digital signals are subject to the same attenuation on the coaxial cables that analog signals at the same frequencies would be. However, although analog television signals at these frequencies are impractical in the network, it is practical to detect and regenerate the digital signals at these frequencies, and they are not conducted via the bridger amplifiers 12 and line extenders 16 with their relatively restricted bandwidths.

Figure 4:
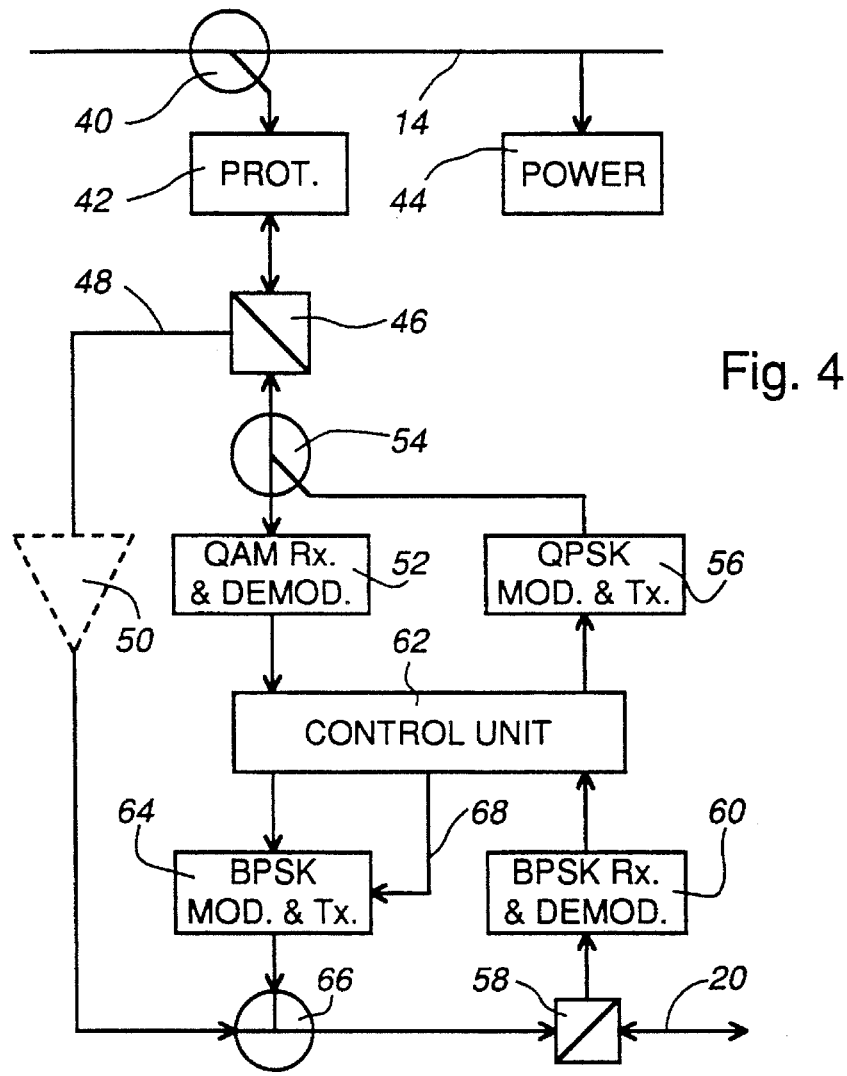
FIG. 4 shows a block diagram of a drop unit used in the network of FIG. 1.

FIG. 4 illustrates a drop unit 34 which as indicated above is assumed here to be provided at a customer tap 16 for delivering signals via the drop cable 20 to a customer premises 20, but could alternatively be provided downstream along the drop cable 20. A directional coupler 40 and protection unit 42 are provided as part of the customer tap 16, via which signals am derived from the coaxial cable 14 in conventional manner, and a power supply unit 44 is provided via which power for the drop unit is derived from the coaxial cable 14 in known manner. Upstream control signals are also supplied to the cable 14 via the protection unit 42 and the coupler 40. For simplicity it is assumed in the following description that low frequency upstream control signals are not present.

The drop unit includes a diplexing filter 46 which separates the downstream 6 MHz television channels onto a path 48 which may optionally include an amplifier 50, shown in broken fines. The downstream 16 QAM signals as described above are supplied from the diplexing filter 46 to a 16 QAM receiver (Rx) and demodulator (DEMOD.) unit 52 via a directional coupler 54, and upstream BPSK signals are supplied from a QPSK modulator (MOD.) and transmitter (Tx) unit 56 via the directional coupler 54 to the diplexing filter 46. The transmitter unit 56 is supplied with upstream signals from the terminals connected to this drop unit via the coaxial cable drop 20, a diplexing filter 58, a BPSK receiver and demodulator unit 60, and a control unit 62 which can also produce its own upstream signals. The control unit 62 also supplies a downstream signal to a BPSK modulator and transmitter unit 64, whose output is combined with the downstream 6 MHz television channels from the path 48 in a mixer 66 and supplied to the cable drop 20 via the diplexing filter 58.

As can be appreciated, the units 52, 56, and 62 serve to provide communications with an FTU 26 and the head end of the network, for supply of desired digital signals to the customer premises 24 served by the drop unit. Thus the receiver unit 52 can comprise one or more receivers for receiving the downstream digital signals in one or more of the frequency ranges as described above with reference to FIG. 2, and the transmitter unit 56 operates in the upstream frequency range also as described above with reference to FIG. 2. The control unit 62 can derive the selected downstream digital signals for supply to the customers in any desired manner. For example, as described further below the signals are communicated using ATM (asynchronous transfer mode) cells, with the data of each digital video signal channel being identified by an address in the header of each ATM cell carrying that data, and the control unit 62 using the address to determine whether or not to supply the cell data to the transmitter unit 64. ATM cells can also be sent from the head end to the drop unit to inform the control unit 62 of the signal entitlement of each terminal served by the drop unit.

In particular, the downstream and upstream signals can be communicated in accordance with the method described in detail in the related application by Michael Takefman already referred to above and incorporated herein by reference.

More specifically, the downstream signals supplied by each FTU 26 to the coaxial cable 14 can comprise 125 μs tdm (time division multiplex) frames each of which accommodates a number of ATM cells each of which consists of 53 8-bit bytes or octets, including a header of 5 octets and a payload of 48 octets. The upstream signals from the control units 62 of the drop units 34 can comprise 125 μs TDMA (time division multiple access) frames which also can include ATM cells in a similar manner, and/or can include other signalling formats for example for polling signals from the drop units to the FTUs 26.

Figure 5:
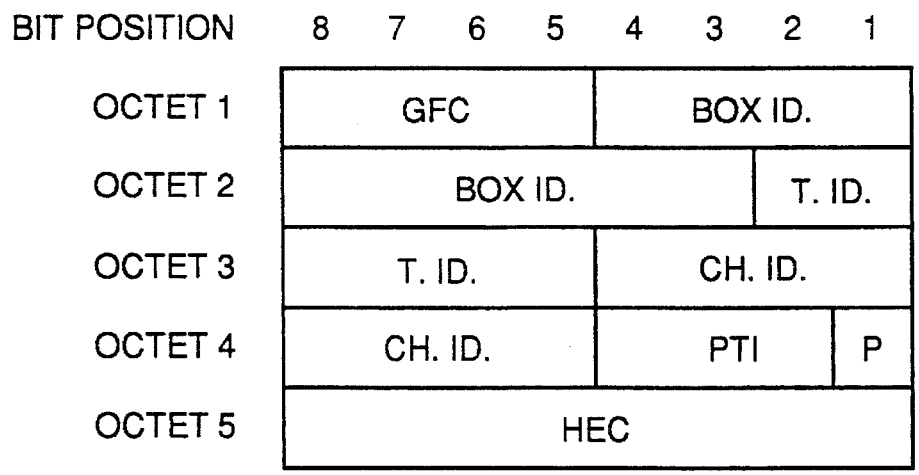
FIG. 5 illustrates a header for ATM cells in a downstream signal, with reference to which addressing is described.

FIG. 5 illustrates in conventional manner the contents of the header of an ATM cell for the downstream signals. The header comprises a 4-bit generic flow control (GFC) field, a 3-bit payload type identifier (PTI) field, a cell loss priority (P) bit, and an 8-bit header error control (HEC) field which enables the ATM cell header to be identified, all with their known functions and known positions in the header. The remaining 24 bits of the header, which conventionally are constituted by an 8-bit virtual path identifier (VPI) and a 16-bit virtual channel identifier (VCI) of an ATM cell, are replaced as follows:

a BOX ID. comprising 4 bits of octet 1 and 6 bits of octet 2, constituting a 10-bit address which identifies a customer premises 24 or corresponding drop unit 34 for which the ATM cell is intended;

a terminal identity T. ID. comprising the other 2 bits of octet 2 and 4 bits of octet 3, constituting a 6-bit address for different terminals 36 connected to the same drop unit 34; and the other 4 bits of octet 3 and 4 bits of octet 4, constituting an 8-bit channel identity (CH. ID.) which enables any of up to 64 logical channels to be identified for any particular terminal.

Thus in each drop unit 34, a downstream signal received and demodulated in the unit 52 is examined by the control unit 62 for the address BOX ID. of the drop unit, and in the event of a matching address the ATM cell is forwarded by the control unit 62 to the modulator and transmitter unit 64, whereby only ATM cells intended for the particular customer premises are forwarded via the drop cable 20. Other cells not intended for this customer premises are replaced by null cells in the forwarded downstream signal. In the upstream direction, BPSK signals received from the terminals 36 are received and demodulated in the unit 60, and are forwarded upstream via the modulator and transmitter unit 56 under the control of the control unit 62, for example in an ATM cell at a time allocated to the control unit 62 for upstream transmission in the upstream TDMA frames.

As can be seen from the above description, the network as described above enables all of the needs and desires discussed in the introduction to be satisfied. More particularly, the provision of the optical fibers 28 and the fiber termination units 26 enables digital signals to be communicated in both directions to and from various points along the coaxial cable distribution network, the signals being communicated via the coaxial cables 14 between the FTUs 26 and the drop units 34 without excessive attenuation in spite of their high frequencies. The use of QAM for the downstream digital signals permits a high additional downstream signal capacity or bandwidth to be provided to a conventional existing cable network.

On the downstream side of each drop unit 34, i.e. within the customer premises 24 and optionally on the drop cable 20, BPSK modulation is used which is relatively immune to noise and interference due to situations within the customer premises, so that there is a reliable communication of signals at the customer premises without any requirement for rewiring or conditioning of equipment at the customer premises. The addressing of downstream ATM cells, and the selection of these for each customer premises 24 within the respective drop unit 34 as described above, ensures that each customer premises is supplied only with those signals which are addressed to it, so that the needs for privacy and security of signals communicated via the network can be met. Because fewer ATM cells are supplied downstream from each drop unit 34 than are present on the coaxial distribution cables 14, the reduced bandwidth of BPSK signals, in comparison to QAM signals on the cables 14, is still sufficient for supplying all of the selected signals to the customer premises.

In the upstream direction, the receiver and demodulator unit 60 provides a termination of the customer premises wiring as far as the remainder of the network is concerned, so that faults, tampering, noise, and interference at the customer premises have no effect upstream from this point, except for the upstream transmission of signals from the respective drop unit in the allocated TDMA time slots. Thus the need to avoid adverse effects due to one customer premises in other parts of the network is satisfied. In this respect it is observed that although the unit 56 is described above and illustrated as using QPSK modulation, and hence provides an increased capacity (and reduced immunity to interference) compared with the BPSK modulation between the customer premises and the drop unit, other forms of modulation, including BPSK, could be used. If BPSK modulation is also used for upstream transmission from a drop unit 34 to the respective FTU 26, then the unit 56 is still provided, the receiver and demodulator unit 60 still providing a termination of the customer premises wiring at the drop unit.

Although a particular embodiment of the invention has been described in detail, it should be appreciated that numerous modifications, variations, and adaptations may be made without departing from the scope of the invention as defined in the claims.

In particular, it should be appreciated that the particular bit rams, RF spectra, modulation methods, and so on described above are given by way of example, and the invention is not limited thereto except to the extent defined in the claims.

What is claimed is:

1. A cable television signal distribution network in which television signals on a distribution cable are supplied to customer premises via respective customer taps and drop cables, comprising:

an optical fiber path and a fiber termination unit for supplying digital signals to the distribution cable modulated at higher frequencies than the television signals, the digital signals including signals addressed to particular customer premises; and a drop unit coupled in the drop cable of a particular customer premises, the drop unit comprising:

a receiver for receiving and demodulating the digital signals;

a control unit responsive to the addressed signals for identifying digital signals addressed to the particular customer premises; and a transmitter for modulating the identified digital signals addressed to the particular customer premises and for forwarding the modulated signals to the customer premises with the television signals.

2. A network as claimed in claim 1 wherein the transmitter is arranged to modulate the digital signals forwarded to the customer premises by binary phase shift keying.

3. A network as claimed in claim 1 wherein the digital signals on the distribution cable are modulated in accordance with a first form of modulation and the digital signals forwarded to the customer premises are modulated in accordance with a second form of modulation, the second form of modulation having a greater bandwidth and noise immunity than the first form of modulation.

4. A network as claimed in claim 3 wherein the second form of modulation comprises binary phase shift keying.

5. A network as claimed in claim 3 wherein the drop unit further comprises an upstream signal receiver for receiving and demodulating upstream digital signals from the respective customer premises, and an upstream signal transmitter controlled by the control unit for modulating the demodulated upstream digital signals and for forwarding the modulated upstream digital signals to the fiber termination unit.

6. A network as claimed in claim 5 wherein the upstream signal receiver comprises a binary phase shift keying demodulator.

7. A network as claimed in claim 6 wherein the upstream signal transmitter comprises a phase shift keying modulator.

8. A network as claimed in claim 5 wherein the drop unit is coupled directly to the customer tap and via the drop cable to the customer premises.

9. A network as claimed in claim 5 wherein the drop unit is coupled directly to the customer premises and via the drop cable to the customer tap.

10. A network as claimed in claim 1 wherein the drop unit further comprises an upstream signal receiver for receiving and demodulating upstream digital signals from the respective customer premises, and an upstream signal transmitter controlled by the control unit for modulating the demodulated upstream digital signals and for forwarding the modulated upstream digital signals to the fiber termination unit.

11. A network as claimed in claim 10 wherein the drop unit is coupled directly to the customer tap and via the drop cable to the customer premises.

12. A network as claimed in claim 10 wherein the drop unit is coupled directly to the customer premises and via the drop cable to the customer tap.

13. A drop unit for connection via a drop cable between a customer tap and a customer premises in a cable television signal distribution network in which television signals and higher frequency modulated digital signals are supplied to the customer tap via a distribution cable, the digital signals including signals addressed for a particular customer premises, the drop unit comprising:

a downstream signal receiver for receiving and demodulating the digital signals;

a control unit for identifying particular addressed digital signals;

a downstream signal transmitter for modulating the identified particular addressed digital signals and for forwarding the modulated signals to the customer premises with the television signals;

an upstream signal receiver for receiving and demodulating upstream digital signals from the respective customer premises; and an upstream signal transmitter controlled by the control unit for modulating the demodulated upstream digital signals and for forwarding the modulated upstream digital signals to the distribution cable via the customer tap.

14. A drop unit as claimed in claim 13 wherein the downstream signal receiver comprises a demodulator for demodulating digital signals from the distribution cable which are modulated in accordance with a first form of modulation, and the downstream signal transmitter comprises a modulator for modulating identified particular addressed digital signals for forwarding to the customer premises in accordance with a second form of modulation, the second form of modulation having a greater bandwidth and noise immunity than the first form of modulation.

15. A drop unit as claimed in claim 13 wherein the downstream signal transmitter comprises a binary phase shift keying modulator.

16. A drop unit as claimed in claim 15 wherein the upstream signal receiver comprises a binary phase shift keying demodulator.

17. A drop unit as claimed in claim 16 wherein the upstream signal transmitter comprises a phase shift keying modulator.

* * * * *